Dec. 9, 1952     F. CIBOROWSKI     2,620,677
SPROCKET CHAIN TRANSMISSION
Filed Nov. 7, 1946
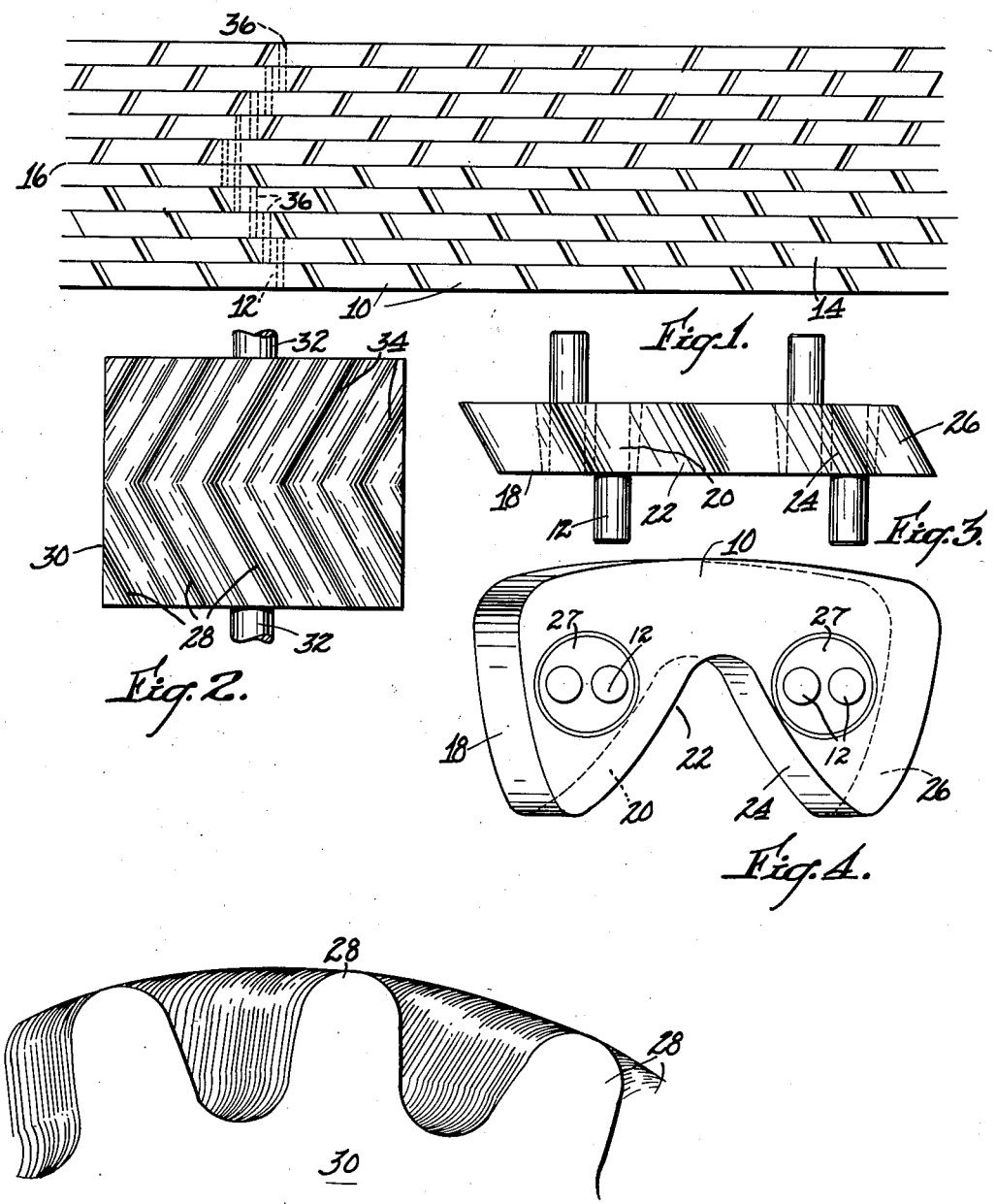
INVENTOR.
Frank Ciborowski
BY Charles R. Fay,
Attorney Patented Dec. 9, 1952

2,620,677

UNITED STATES PATENT OFFICE 2,620,677

SPROCKET CHAIN TRANSMISSION

Frank Ciborowski, Worcester, Mass.

Application November 7, 1946, Serial No. 708,327

5 Claims. (Cl. 74—250)

This invention relates to improvements in chain drives and more particularly to sprocket chains.

The principal object of this invention is to provide a silent and smooth running sprocket and sprocket chain by arranging the chain links and the sprocket wheel teeth in a herringbone pattern, so that the sprocket chain will run somewhat in the manner of a herringbone gear and will achieve the advantages derived from such a gear due to the gradual engagement of the chain links with the sprocket teeth; the provision of a multiple driving chain having a plurality of series of connected links, each of which is formed angularly with respect to the direction of drive and to the axis of the sprocket wheel, each link having a section in the shape of a parallelogram and the sprocket teeth on the wheel being arranged in lines angularly arranged with respect to the axis of the sprocket wheel, to the end that a sprocket chain drive is presented which will run silently and smoothly.

Other objects and advantages of the invention will appear hereinafter.

Reference is to be had to the accompanying drawings, in which

Fig. 1 is a diagrammatical top plan view of a section of the chain according to the invention;

Fig. 2 is a diagrammatical view of the sprocket wheel;

Fig. 3 is a bottom plan view of a link;

Fig. 4 is a view of a link in side elevation; and

Fig. 5 is a view in elevation of a part of a sprocket wheel for the chain.

Referring now to Fig. 1, the chain comprises links 10 arranged in a line and being pivotally connected by pins 12 to a second series of links 14 in offset relation thereto, this construction continuing in rows of links to the center line of the chain indicated at 16. The links in the rows 10 and 14 etc., are each in the form of parallelograms having their leading edges and trailing edges inclined relative to a line at right angles to the direction of drive of the chain.

The remaining half of the chain is similar to that already described but is reversed so that the angles of the leading and trailing edges of the links, while similarly inclined, are complementary thereto, making a V-pattern.

The links themselves as shown in Figs. 3 and 4 present an angular leading edge 18, a sprocket recess 20 having a trailing edge 22 and a leading edge 24, inclined in the same manner as the edge 18, and the link is provided with a trailing edge 26 which has the same angle. All of the links are the same as to one half of the chain, the links of the other half of the chain being similar but having their inclined edges reversed. The edges 18 and 26 are the surfaces contacting the drive teeth.

The pins 12 are arranged in concentric pairs in circular bushings 27, each pair of pins extending oppositely laterally of its link to connect to the next adjacent links in the next adjacent line of links. This construction provides for the circular travel of the chain over the sprocket wheel in a silent and smooth manner.

The sprocket teeth 28 on the wheel 30 are formed complementary to the sprocket receiving openings in the links and this relation is clearly shown in Fig. 2 where the sprocket wheel 30 may turn on an axle 32. In the particular form shown, the teeth 28 on one half the sprocket are complementary to the teeth 34 at the other side of the sprocket in inclined rows, to form a herringbone gear pattern. The pins at 36 are the same as pins 12 and pivotally connect the links in V pattern, see Fig. 1.

The sprocket teeth 28 are clearly shown in Fig. 5, it being noted that both Figs. 4 and 5 are elevational views and are not perspectives.

It is believed that the present invention will be clearly apparent from the above description and when taken in conjunction with the drawings and it is pointed out that the invention presents a chain drive and a sprocket wheel therefor which operates in the manner of a herringbone gear and which will derive all the well known advantages thereof.

Having thus described my invention and the advantages thereof, I do not wish to be limited to the details herein disclosed, otherwise than is set forth in the claims, but what I claim is:

1. A sprocket chain comprising a plurality of lines of links each having a sprocket tooth-engaging surface at an angle to a line normal to the direction of travel of the chain, certain contiguous lines having said surfaces extending coextensively to the center-line of the chain and the remaining lines of links at the other side of the center line having the surfaces at a reverse angle, forming a V shape, pivot means connecting the links in each line, and means connecting the lines of links for simultaneous travel.

2. A silent herringbone transmission chain comprising a series of parallel and connected lines of links, each link having sprocket tooth-engaging surfaces at an angle to a line normal to the direction of travel of the chain, and certain of said links being provided with four pin holes arranged in two pairs, a pin in each hole, the pins in the pairs extending laterally oppositely of the link to engage next adjacent links in the next adjacent lines at both sides of each of the certain links.

3. The chain of claim 2 wherein the pins are at right angles to the links.

4. A link for a silent herringbone sprocket chain, comprising a body recessed centrally to form a pair of sprocket engaging members, said members having inclined leading and trailing edges, a circular bearing in each member, and a pair of pins in each bearing, said pins being parallel and extending laterally of the link at opposite sides thereof at right angles to the link.

5. The link of claim 4 wherein the pins are arranged concentrically with relation to the bearings.

FRANK CIBOROWSKI.

REFERENCES CITED

The following references are of record in the file of this patent:

UNITED STATES PATENTS

| Number | Name | Date |
|---|---|---|
| 1,473,569 | Leyner | Nov. 6, 1923 |
| 1,720,852 | Nichols | July 16, 1929 |
| 1,835,406 | Kirsten | Dec. 8, 1931 |
| 1,979,592 | Weiss | Nov. 6, 1934 |
| 2,030,829 | Belcher | Feb. 11, 1936 |
| 2,369,130 | Benson | Feb. 13, 1945 |